United States Patent
Andarawis et al.

(10) Patent No.: US 7,466,143 B2
(45) Date of Patent: Dec. 16, 2008

(54) CLEARANCE MEASUREMENT SYSTEMS AND METHODS OF OPERATION

(75) Inventors: Emad Andarawis Andarawis, Ballston Lake, NY (US); Richard Louis Frey, Delanson, NY (US); Samhita Dasgupta, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 318 days.

(21) Appl. No.: 11/229,251

(22) Filed: Sep. 16, 2005

(65) Prior Publication Data

US 2007/0222459 A1    Sep. 27, 2007

(51) Int. Cl.
G01R 27/04 (2006.01)
(52) U.S. Cl. .................. 324/644; 324/646; 324/662
(58) Field of Classification Search ............ 324/644, 324/646, 662
See application file for complete search history.

(56) References Cited

U.S. PATENT DOCUMENTS

| | | |
|---|---|---|
| 3,898,472 A | 8/1975 | Long |
| 4,045,727 A * | 8/1977 | Yu et al. ............... 324/644 |
| 5,070,302 A | 12/1991 | Marcus et al. .......... 324/662 |
| 5,101,165 A | 3/1992 | Rickards ............... 324/662 |
| 5,119,036 A | 6/1992 | Rickards et al. ........ 324/662 |
| 5,166,626 A | 11/1992 | Hester et al. .......... 324/690 |
| 5,353,798 A | 10/1994 | Sieben |
| 5,564,434 A | 10/1996 | Halperin et al. |
| 5,581,257 A * | 12/1996 | Greene et al. .......... 342/51 |
| 5,748,005 A | 5/1998 | McCormick et al. |
| 5,933,550 A | 8/1999 | Fujieda et al. |
| 5,990,807 A | 11/1999 | Cloutier et al. |
| 6,163,723 A | 12/2000 | Roberts et al. |
| 6,239,601 B1 | 5/2001 | Weinstein |
| 6,401,541 B1 | 6/2002 | Kurtz |
| 6,420,882 B1 | 7/2002 | Engebretsen et al. |
| 6,441,623 B1 | 8/2002 | Moon |
| 6,593,755 B1 | 7/2003 | Rosengren |
| 6,668,614 B2 | 12/2003 | Itakura |
| 6,717,418 B2 | 4/2004 | Orenstein ............... 324/664 |
| 6,744,264 B2 | 6/2004 | Gogoi et al. |
| 6,788,112 B1 | 9/2004 | Chan et al. |
| 6,876,209 B2 | 4/2005 | Lin et al. |
| 6,944,359 B2 | 9/2005 | Kamei et al. |
| 7,180,305 B2 | 2/2007 | Andarawis et al. |
| 2003/0011378 A1 | 1/2003 | Ishio et al. |
| 2003/0094956 A1 | 5/2003 | Orenstein |
| 2003/0215323 A1 | 11/2003 | Prinz et al. |
| 2004/0158980 A1 | 8/2004 | Nakatani et al. |
| 2004/0265488 A1 | 12/2004 | Hardwicke et al. |
| 2005/0052268 A1 | 3/2005 | Pleskach et al. |

(Continued)

OTHER PUBLICATIONS

J. A. Ruud et al., "Sensor Assembly, Transformers and Methods of Manufacture," U.S. Appl. No. 11/528,236, filed Sep. 27, 2006.

*Primary Examiner*—Vincent Q Nguyen
(74) *Attorney, Agent, or Firm*—Penny A. Clarke

(57) ABSTRACT

A method is provided and includes exciting a sensor with an incident signal and generating a reflected signal by reflecting the incident signal from the sensor. The incident signal and the reflected signal interfere to form a standing wave. The method also includes processing the signals to determine a sensed parameter based upon a frequency at which the standing wave exhibits a null.

28 Claims, 5 Drawing Sheets

U.S. PATENT DOCUMENTS

| | | |
|---|---|---|
| 2005/0077911 A1 | 4/2005 | Miyasaka |
| 2005/0103112 A1 | 5/2005 | Pedersen et al. |
| 2006/0006960 A1 | 1/2006 | Lin et al. |
| 2006/0066318 A1 | 3/2006 | Andarawis et al. |
| 2006/0103003 A1 | 5/2006 | Heide et al. |
| 2006/0125492 A1 | 6/2006 | Andarawis et al. |
| 2006/0132147 A1 | 6/2006 | Balasubramaniam et al. |
| 2006/0239813 A1 | 10/2006 | Shah et al. |

* cited by examiner

CLEARANCE MEASUREMENT SYSTEMS AND METHODS OF OPERATION

BACKGROUND OF THE INVENTION

The invention relates generally to sensor systems, and more particularly to a microwave-based or radio frequency (RF) based sensor system for measuring a clearance between two objects through a standing wave null detection technique.

Various types of sensors have been used to measure the distance between two objects. In addition, these sensors have been used in various applications. For example, a turbine has a number of turbine blades that are disposed adjacent to a shroud. The clearance between one of the turbine blades and the shroud varies depending on the temperature of the turbine region. It is desirable that a gap or clearance between the turbine blades and the shroud be maintained for safe and efficient operation of the turbine. A sensor may be disposed within the turbine to measure the distance between the turbine blades and the shroud. The distance may be used to direct movement of the shroud to maintain the desired displacement between the shroud and the turbine blades.

In certain applications, a microwave-based sensor is employed to measure the distance between two objects. Such sensors exhibit an impedance, which varies with the relative physical position of the adjacent objects. Typically, the impedance is determined based upon phase and magnitude measurements of an incident and a reflected signal from the sensor. Unfortunately, existing measurement techniques for measuring the phase and magnitude of the incident and the reflected signals can be relatively inaccurate. Further, such measurement systems require high complexity electronics in order to make accurate measurements. Incorporation of such electronics and other processing requirements is a challenge due to costs, power consumption, size and added complexity involved in such processing requirements.

Accordingly, a need exists for providing a sensor system that provides an accurate measurement of clearance between two objects by employing a relatively simpler, robust and cost-effective measurement technique. It would also be advantageous to provide a sensor system that could be employed for accurate clearance measurement by minimizing the effect of calibration drift and noise in a system.

BRIEF DESCRIPTION

Briefly, according to one embodiment of the invention, a method is provided. The method includes exciting a sensor with an incident signal and generating a reflected signal by reflecting the incident signal from the sensor. The incident signal and the reflected signal interfere to form a standing wave. The method also includes processing the signals to determine a sensed parameter based upon a frequency at which the standing wave exhibits a null.

In another embodiment, a sensor system for measuring a clearance between a first object and a second object is provided. The sensor system includes a sensor disposed on one of the first or second objects. The sensor is configured to receive an incident signal and to reflect the incident signal to generate a reflected signal, and the incident signal and the reflected signal interfere to form a standing wave. The sensor system also includes an excitation source configured to generate the incident signal and a processing unit configured to determine the clearance between the first and second objects based upon a frequency at which the standing wave exhibits a null.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
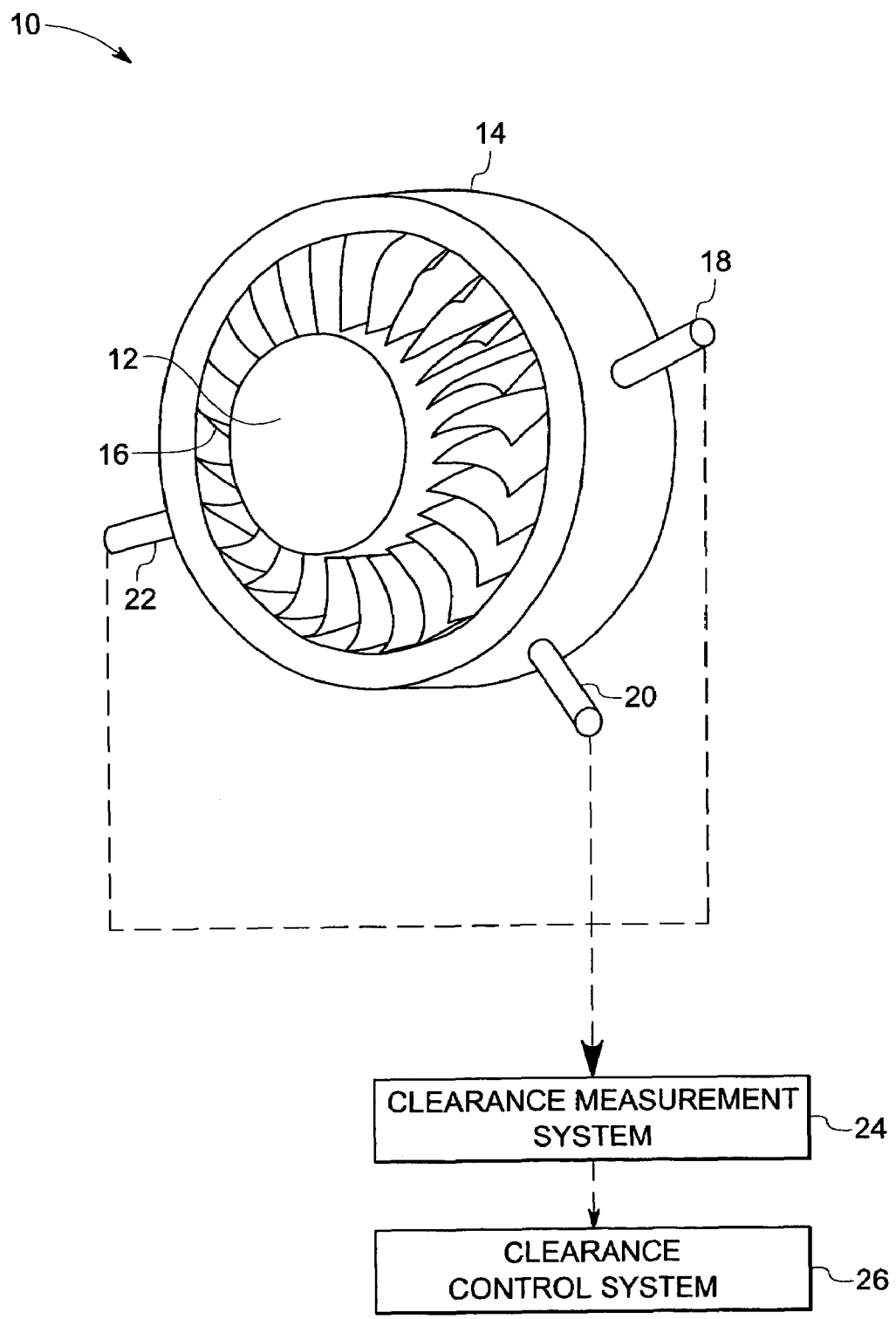
FIG. 1 is a diagrammatical perspective illustration of an engine having a sensor system in accordance with embodiments of the present technique.

As discussed in detail below, embodiments of the present technique function to provide an accurate measurement of clearance between two objects in various systems such as an aircraft engine, a steam turbine, and so forth. Referring now to the drawings, FIG. 1 illustrates a rotating component, such as in a turbine 10 of an aircraft engine, having a rotor 12 disposed within a casing 14. Further, the rotor 12 includes a number of turbine blades 16 disposed within the casing 14. A number of sensors 18, 20, and 22 are disposed within the casing 14 for measuring the clearance between the casing 14 and the turbine blades 16. In this illustrated embodiment, three sensors 18, 20, and 22 are employed at three different locations for clearance measurement between the casing 14 and the blades 16. However, a greater or lesser number of sensors may be used in other embodiments.

In the embodiment illustrated in FIG. 1, signals representative of the clearance are detected by the sensors 18, 20 and 22, and the signals are then transmitted to a clearance measurement system 24 to estimate a clearance between the casing 14 and the blades 16 at different locations. Further, the clearance measurement through the clearance measurement system 24 is used for controlling the clearance between the casing 14 and the turbine blades 16 via a clearance control system 26. In this embodiment, a null detection technique is employed for calculating the clearance from the signals received from the sensors 18, 20 and 22 as described in detail below.

Figure 2:
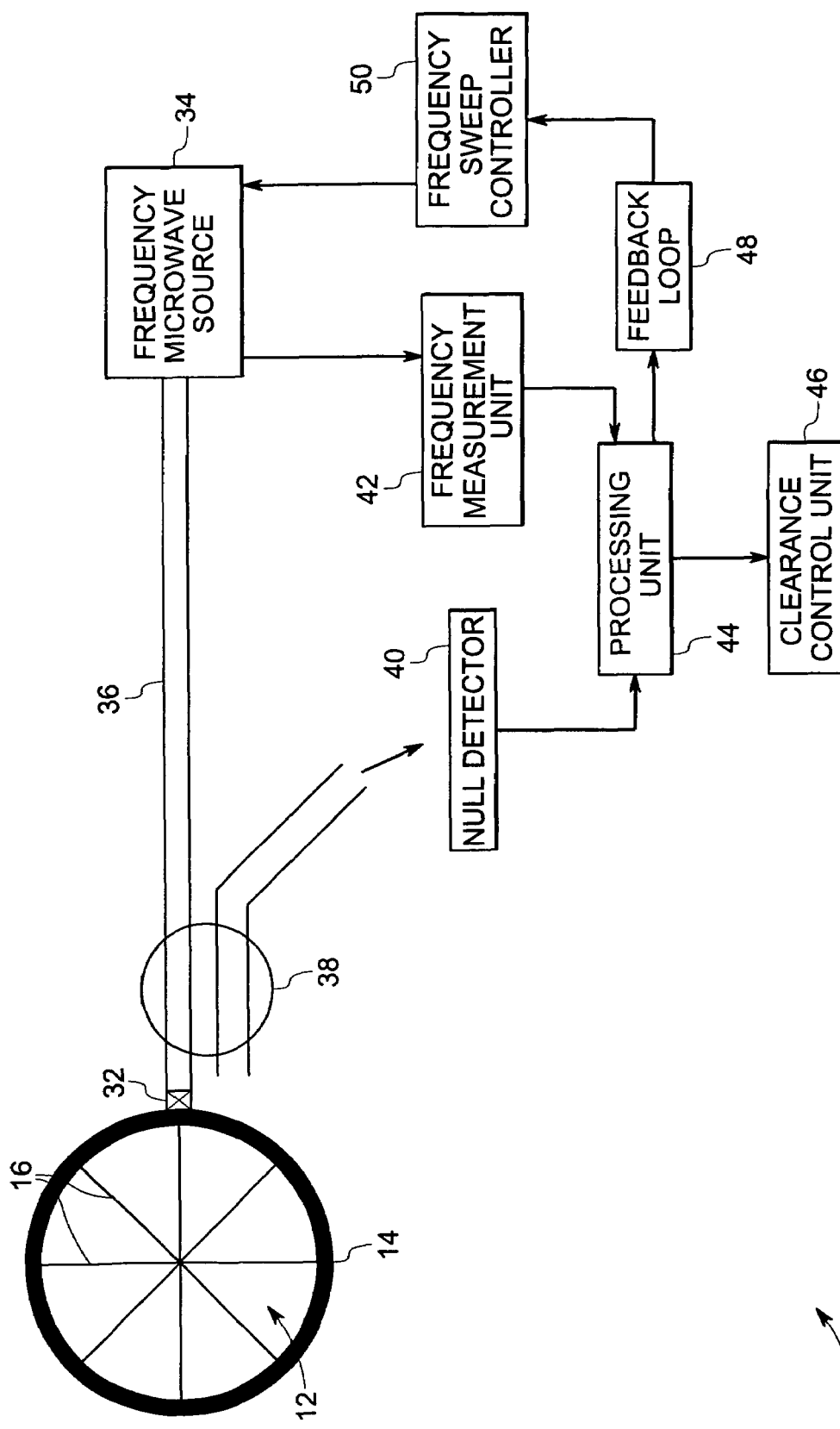
FIG. 2 is a diagrammatical representation of the sensor system of FIG. 1 in accordance with embodiments of the present technique.

FIG. 2 is a diagrammatical representation of the sensor system of FIG. 1 in accordance with embodiments of the present technique. In this embodiment, an exemplary sensor system 30 includes a sensor 32 for measuring the clearance between two objects such as the casing 14 and the blades 16. One exemplary sensor 32 is a capacitive probe. The sensor system 30 also includes an excitation source 34 such as a microwave source 34 that is configured to generate an incident microwave signal. Although, the present invention describes application of a microwave signal to the sensor 32, the present technique may use a radio frequency signal to excite the sensor 32. Accordingly, the appended claims should not be limited to or by the exemplary embodiments provided in the following discussion. In a presently contemplated configuration, the microwave source 34 includes a variable microwave frequency source. Exemplary microwave sources 34 include a voltage-controlled oscillator and a current-controlled oscillator. Further, a waveguide 36 is employed to convey the incident microwave signal from the microwave source 34 to the sensor 32. In operation, the sensor 32 receives the incident microwave signal from the microwave source 34 and reflects the incident microwave signal to generate a reflected microwave signal. Further, the incident microwave signal and the reflected microwave signal from the sensor 32 interfere to form a standing wave. In the illustrated embodiment, a directional coupler 38 is employed to separate the incident and reflected signals for frequency monitoring and measurement of radio frequency power in the sensor system 30.

Moreover, the sensor system 30 includes a null detector 40 for processing the microwave signals to determine a lowest value of an amplitude of the generated standing wave. In one embodiment, the null detector 40 includes a diode to convert radiofrequency amplitude to a direct current value and circuitry to look for the lowest direct current value. In another embodiment, the null detector 40 includes a shape comparator for comparing the signals. In certain embodiments, the signals may be integrated over a time period and are subsequently compared to a signal received during the next time period. For example, the null detector 40 may include a matched filter for detecting the standing wave null. In addition, a frequency measurement unit 42 is coupled to the microwave source 34 to measure the frequency of the incident microwave signal supplied to the sensor 32 at which the standing wave exhibits the null. In one embodiment, the frequency measurement unit 42 may measure the frequency of the incident microwave signal via a frequency counter. In certain embodiments, the frequency of the incident microwave signal may be related to a direct current voltage or current applied to the microwave source 34. In one embodiment, a frequency sweep is performed to sweep through a number of frequencies to detect the null. In an alternate embodiment, a feedback loop may be employed to adjust the frequency of the incident microwave signal to the sensor 32 for null detection. The feedback loop will be described in a greater detail below.

In a presently contemplated configuration, a processing unit 44 is coupled to the null detector 40 and to the frequency measurement unit 42. The processing unit 44 is configured to determine the clearance between the casing 14 and the blades 16 based upon a frequency at which the standing wave exhibits a null. More particularly, the processing unit 44 determines an impedance between the casing 14 and blades 16 based upon the frequency at which the standing wave null appears. In one embodiment, the processing unit 44 determines a capacitance between the casing 14 and blades 16 based upon the frequency at which the standing wave null appears. Such capacitive measurements are used to determine the clearance between the casing 14 and the rotor 12. In certain embodiments, the processing unit 44 may utilize a calibration table, a look-up table, equations based on first principles, or combinations thereof to determine the clearance based upon the frequency at which the standing wave exhibits a null. Further, the clearance measurements estimated by the processing unit 44 may be utilized to control the clearance between the casing 14 and the blades 16 via a clearance control unit 46.

In certain embodiments, the processing unit 44 is configured to generate a feedback signal based upon a comparison between the lowest value of the signal and the null. This generated feedback signal is conveyed to the microwave frequency source 34 via a feedback loop 48. In particular, the frequency of the signals generated from the microwave source 34 is controlled in response to the feedback signal through a frequency sweep controller 50. In an exemplary embodiment, the frequency sweep controller 50 is magnetically controlled. Thus, the frequency of the incident microwave signals supplied to the sensor 32 is varied until the standing wave exhibits a null. Further, the frequency at which the standing wave null occurs is advantageously utilized to determine the clearance between two objects. The formation of standing wave and standing wave null detection through the sensor system 30 is described below with reference to FIGS. 3 and 4.

Figure 3:
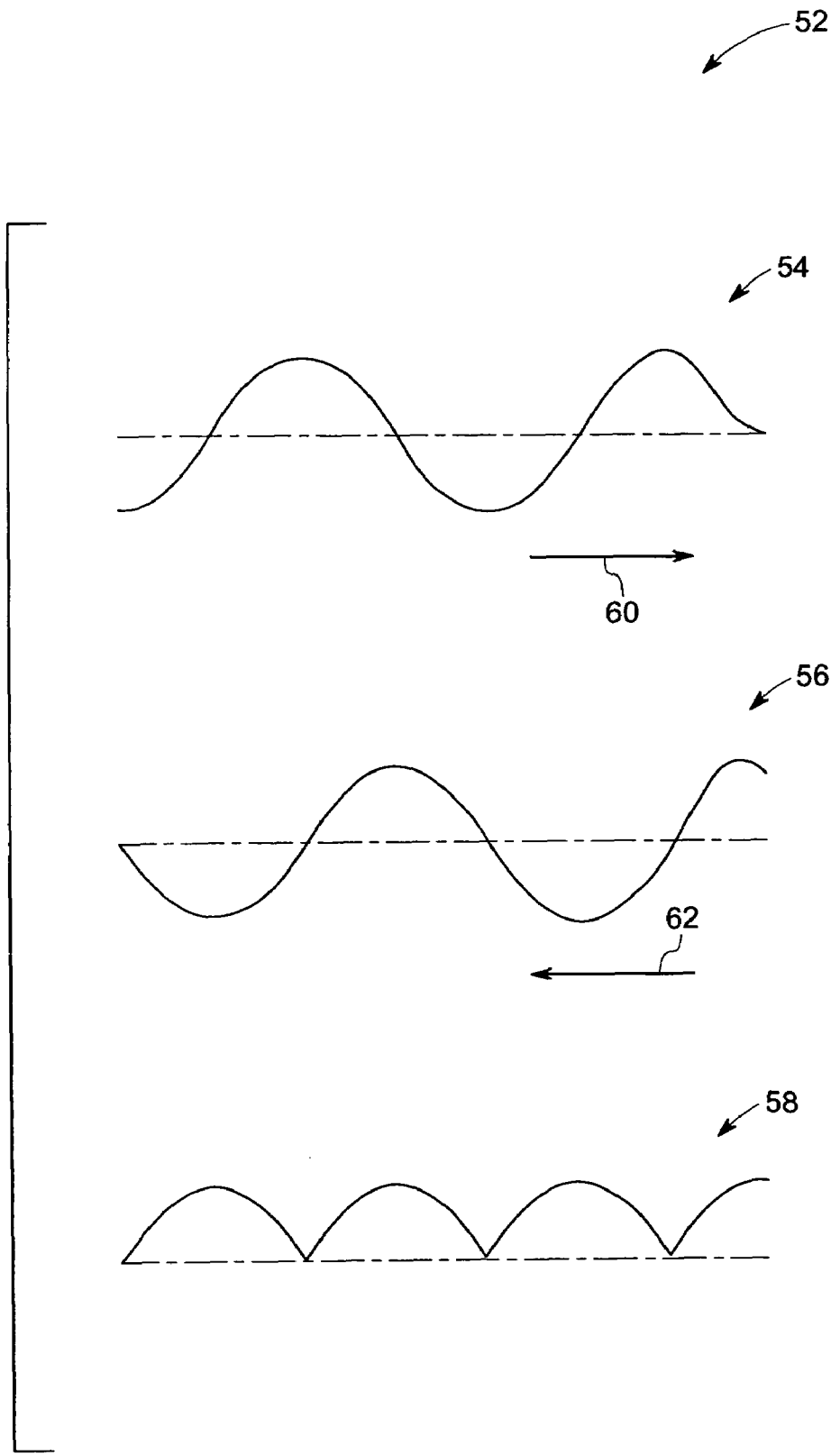
FIG. 3 is a diagrammatical representation of exemplary waveforms for an incident wave, a reflected wave, and a standing wave generated from the sensor system of FIG. 2.

FIG. 3 is a diagrammatical representation of exemplary waveforms 52 for an incident wave 54, a reflected wave 56, and a standing wave 58 generated from the sensor system of FIG. 2. As illustrated, the incident wave 54 is generated from the microwave source 34 and is transmitted to the sensor 32 in a direction 60. Further, the sensor 32 reflects the incident wave 54 to generate the reflected signal 56 in a direction 62 that is opposite to the direction 60 of the incident wave 54. In the illustrated embodiment, the incident and reflected signals 54 and 56 interfere to form the standing wave 58. As illustrated, at certain points the incident and the reflected waves 54 and 56 are exactly in phase resulting in maximum voltage. Alternatively, at certain other points the incident and reflected waves 54 and 56 are in opposition and voltage nodes or null points are produced. In a present embodiment, the frequency at which the standing wave 58 exhibits a null is utilized for clearance measurement between two objects as discussed before.

Figure 4:
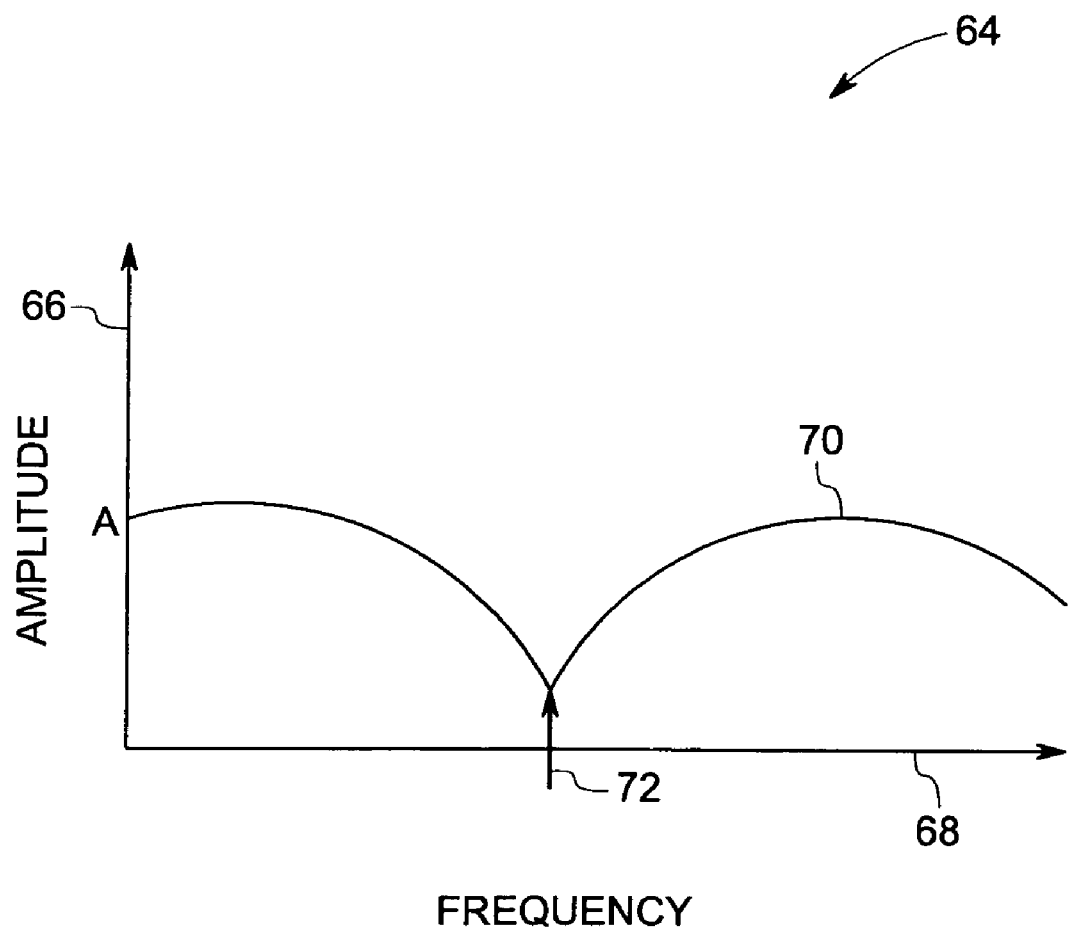
FIG. 4 is a graphical representation of exemplary signal strength and the frequency for the standing wave of FIG. 3.

FIG. 4 is a graphical representation of exemplary distribution 64 of signal strength for the standing wave 58 of FIG. 3. In the illustrated embodiment, the ordinate axis represents an amplitude 66 of the standing wave 58 and the abscissa axis represents a frequency 68 of the microwave signal. The distribution of the amplitude with frequency of the standing wave 58 is represented by waveform 70. As will be appreciated by one skilled in the art, the waveform 70 will move in left or right directions at different points in time corresponding to different clearance values between two objects. The processing unit 40 (see FIG. 3) determines a lowest value of the amplitude 66 from the waveform 70 to detect a standing wave null. As will be appreciated by one skilled in the art, other null detection techniques may be employed to detect the standing wave null for the waveform 70. For example, an even shaped magnitude flutter at twice the blade passing frequency is indicative of a null in the embodiment illustrated in FIG. 1.

Moreover, the frequency at which the standing wave null is detected is utilized for clearance measurement. In this exemplary embodiment, the frequency at which the standing wave 58 exhibits a null is represented by 72. As described earlier, the frequency 72 may be measured by the frequency measurement unit 42 (see FIG. 3) that may include a frequency counter or may be related to a direct current voltage or current applied to control the frequency of the microwave source 34. Additionally, the frequency of the incident microwave signal supplied to the sensor 32 may be controlled in response to a feedback signal to minimize a difference between a lowest value of the signal and the null.

Figure 5:
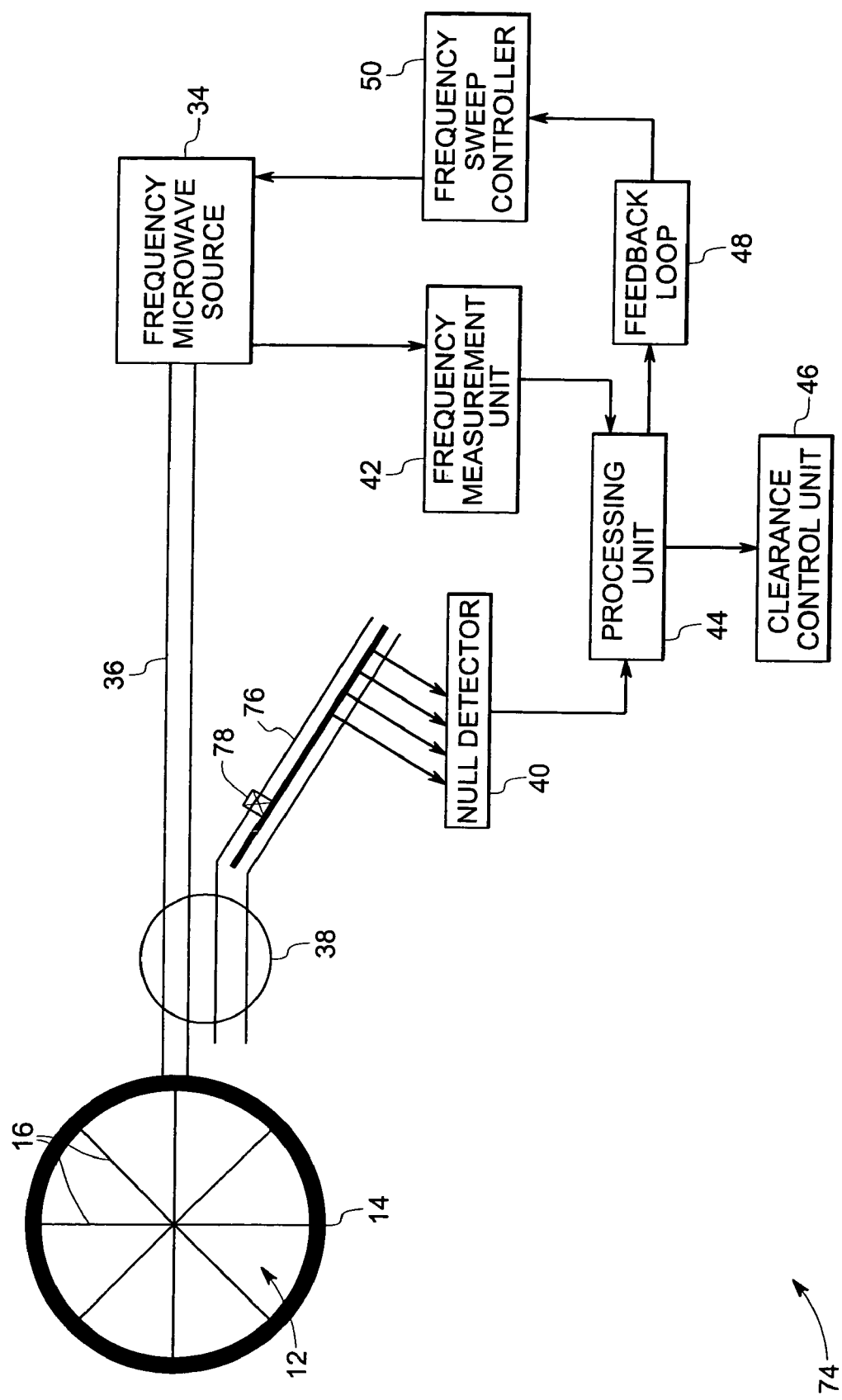
FIG. 5 is a diagrammatical illustration of the sensor system of FIG. 1 in accordance with another embodiment of the present technique.

FIG. 5 is a diagrammatical illustration of an exemplary configuration 74 of the sensor system of FIG. 1. In this embodiment, the sensor system 74 includes a slotted transmission line 76 to transmit the incident microwave signal to a sensor 78 and to transmit the reflected microwave signal from the sensor 78. The slotted transmission line 76 includes a slot to facilitate detection of a standing wave null at one of a number of locations on the slotted transmission line 76. Further, the microwave signals corresponding to each of the number of locations are processed via the processing unit 44 to determine the clearance between the two objects. In this embodiment, the probe 78 moves within the slot to sample the transmission line voltage. The probe 78 measures the electric field present in the slotted transmission line 74. Moreover, a detector (not shown) may be employed to convert the measured field to a voltage. In certain embodiments, the detector may be integrated with the probe 78.

In certain embodiments, the probe 78 is positioned at different taps on the slotted transmission line 76 for detection of standing wave at different locations on the slotted transmission line 76. For example, a linear array of detector diodes may be employed for detection of the standing wave null. In certain embodiments, the spacing between the diodes may be selected to achieve a desired accuracy. Further, a standing wave ratio meter (not shown) may be employed to determine the wavelength and standing wave ratio on the slotted transmission line 76.

In an exemplary embodiment, a hybrid approach is employed for standing wave null detection. In this embodiment, a lowest value of the signal is determined between two probes 78 on the slotted transmission line 76. Further, the feedback loop 48 is employed to adjust the frequency of the microwave source 34 such that the null is positioned at one of the two probes 78. In an alternate embodiment, the frequency of the microwave source 34 is adjusted such that the null is centered between the two probes 78.

In this exemplary embodiment, the processing unit 44 is configured to determine a capacitance between the first and second objects based upon the location of the standing wave null and the frequency at which the standing wave null is detected. Further, such capacitive measurements are utilized to determine the clearance between two objects such as the rotor 12 and the casing 14 of FIG. 1.

The various aspects of the method described hereinabove have utility in different applications. For example, the technique illustrated above may be used for measuring the clearance between rotating and static components in an aircraft engine. The technique may also be used in certain other applications, for example, for measuring clearance between objects in gas turbines, steam turbines, and so forth. As will be appreciated by one skilled in the art the technique may be used for various manufacturing processes that require tight clearances. Further, the technique may be used to detect vibration of parts that appears as distortion of the standing waveform. Such vibration detection may be utilized for instrument health monitoring.

As noted above, even more generally, the method described herein may be advantageous for providing accurate measurement of clearance between objects through sensors by employing a standing wave null detection technique. Further, the technique is particularly advantageous to provide a self-calibrating sensor system for accurate clearance measurement of parts, even in operation and over extended periods of time, enabling better clearance control in parts while in operation.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method comprising:
   exciting a sensor with an incident signal;
   generating a reflected signal by reflecting the incident signal from the sensor, wherein the incident signal and the reflected signal interfere to form a standing wave;
   processing the signals to determine a sensed parameter based upon a frequency at which the standing wave exhibits a null, wherein processing the microwave signals comprises determining a lowest value of an amplitude of the standing wave; and
   varying a frequency of the incident signal supplied to the sensor until the standing wave exhibits the null,
   wherein the processing further comprises:
   generating a feedback signal based on a comparison between the lowest value and the null; and
   controlling the frequency of the incident signal supplied to the sensor in response to the feedback signal to minimize a difference between the lowest value and the null.

2. The method of claim 1, wherein the incident and reflected signals comprise microwave signals.

3. The method of claim 1, wherein the incident and reflected signals comprise radio frequency signals.

4. The method of claim 1, wherein the sensed parameter is an impedance between a first object and a second object.

5. The method of claim 4, wherein the sensed parameter is a capacitance between the first object and the second object.

6. The method of claim 1, further comprising measuring a frequency of the incident signal supplied to the sensor.

7. A method comprising:
   exciting a sensor with an incident signal;
   generating a reflected signal by reflecting the incident signal from the sensor, wherein the incident signal and the reflected signal interfere to form a standing wave;
   processing the signals to determine a sensed parameter based upon a frequency at which the standing wave exhibits a null;
   transmitting the incident signal to the sensor via a slotted transmission line;
   transmitting the reflected signal from the sensor via the slotted transmission line; and
   monitoring the signals at a plurality of locations on the slotted transmission line,
   wherein the sensed parameter is determined based upon a location of a standing wave null along the slotted transmission line and a frequency at which the standing wave null is detected.

8. A method of measuring a clearance between a first object and a second object, the method comprising:
   supplying an incident signal to a sensor disposed on one of the first or second objects;
   reflecting the incident signal from the sensor to generate a reflected signal, wherein the incident signal and the reflected signal interfere to form a standing wave; and
   processing the signals to determine the clearance between the first and second objects based upon a frequency at which the standing wave exhibits a null, wherein the processing comprises:
   determining an impedance between the first and second objects based upon a frequency at which a standing wave null appears, and
   determining a capacitance between the first and second objects based upon the frequency at which the standing wave null appears.

9. The method of claim 8, wherein the incident and reflected signals comprise microwave signals.

10. The method of claim 8, wherein the incident and reflected signals comprise radiofrequency signals.

11. The method of claim 8, wherein the first and second objects comprise components in a gas turbine engine, and wherein processing the signals comprises estimating the clearance between the two components in the gas turbine engine.

12. The method of claim 8, wherein the first and second objects comprise components in a steam turbine, and wherein processing the measurement signals comprises estimating the clearance between the two components in the steam turbine.

13. The method of claim 8, further comprising:
transmitting the incident signal to the sensor via a slotted transmission line;
transmitting the reflected signal from the sensor via the slotted transmission line; and
monitoring the signals at a plurality of locations on the slotted transmission line to detect a standing wave null, wherein the sensed parameter is determined based upon a standing wave null location on the slotted transmission line and a frequency at which the standing wave null is detected.

14. A sensor system for measuring a clearance between a first object and a second object, the sensor system comprising:
a sensor disposed on one of the first or second objects, wherein the sensor is configured to receive an incident signal and to reflect the incident signal to generate a reflected signal, wherein the incident signal and the reflected signal interfere to form a standing wave;
an excitation source configured to generate the incident signal; and
a processing unit configured to determine the clearance between the first and second objects based upon a frequency at which the standing wave exhibits a null, wherein the processing unit is configured to:
determine an impedance between the first and second objects based upon the frequency at which a standing wave null appears, and
determine a capacitance between the first and second objects based upon the frequency at which the standing wave null appears.

15. The sensor system of claim 14, wherein the incident and reflected signals comprise microwave signals.

16. The sensor system of claim 14, wherein the incident and reflected signals comprise radiofrequency signals.

17. The sensor system of claim 14, further comprising a waveguide configured to convey the incident signal from the excitation source to the sensor and to convey the reflected signal from the sensor to the processing unit.

18. The sensor system of claim 14, further comprising a directional coupler configured to separate the incident and reflected signals.

19. The sensor system of claim 14, wherein the processing unit comprises a calibration table, a look-up table, a plurality of equations based on first principles, or combinations thereof to determine the clearance based upon the frequency at which the standing wave exhibits the null.

20. A sensor system for measuring a clearance between a first object and a second object, the sensor system comprising:
a sensor disposed on one of the first or second objects, wherein the sensor is configured to receive an incident signal and to reflect the incident signal to generate a reflected signal, wherein the incident signal and the reflected signal interfere to form a standing wave;
an excitation source configured to generate the incident signal;
a processing unit configured to determine the clearance between the first and second objects based upon a frequency at which the standing wave exhibits a null,
wherein the excitation source comprises a variable microwave frequency source configured to vary a frequency of the incident signal supplied to the sensor until the standing wave exhibits the null, the sensor system further comprising:
a null detector for processing the signals to determine a lowest value of an amplitude of the standing wave, wherein the processing unit is further configured to receive the lowest value from the null detector.

21. The sensor system of claim 20, wherein the processing unit is further configured to:
generate a feedback signal based on a comparison between the lowest value and the null; and
control the variable microwave frequency source to vary the frequency of the incident signal supplied to the sensor in response to the feedback signal.

22. The sensor system of claim 20, further comprising a frequency measurement unit for measuring the frequency of the incident signal supplied to the sensor at which the standing wave exhibits the null.

23. A sensor system for measuring a clearance between a first object and a second object, the sensor system comprising:
a sensor disposed on one of the first or second objects, wherein the sensor is configured to receive an incident signal and to reflect the incident signal to generate a reflected signal, wherein the incident signal and the reflected signal interfere to form a standing wave;
a slotted transmission line configured to transmit the incident signal to the sensor and to transmit the reflected signal from the sensor, wherein the slotted transmission line comprises a slot to facilitate detection of a standing wave null at one of a plurality of locations on the slotted transmission line; and
a processing unit configured to process the signals corresponding to each of the plurality of locations to determine the clearance between the first and second objects based upon the location of the standing wave null and a frequency at which the standing wave null is detected, wherein the processing unit is configured to:
determine an impedance between the first and second objects based upon the location of the standing wave null and the frequency at which the standing wave null is detected, and
determine a capacitance between the first and second objects based upon the location of the standing wave null and the frequency at which the standing wave null is detected.

24. The sensor system of claim 23, wherein the incident and reflected signals comprise microwave signals.

25. The sensor system of claim 23, wherein the incident and reflected signals comprise radiofrequency signals.

26. The sensor system of claim 23, further comprising a variable frequency source configured to supply the incident signal to the sensor via the slotted transmission line and to vary a frequency of the incident signal supplied to the sensor until the standing wave null is detected.

27. The sensor system of claim 23, further comprising at least one probe configured to monitor the signals at one or more of the locations along the slot.

28. The sensor system of claim 27, comprising a plurality of probes, wherein each of the probes is configured to monitor the signals at a respective location along the slot.

\* \* \* \* \*